UNITED STATES PATENT OFFICE.

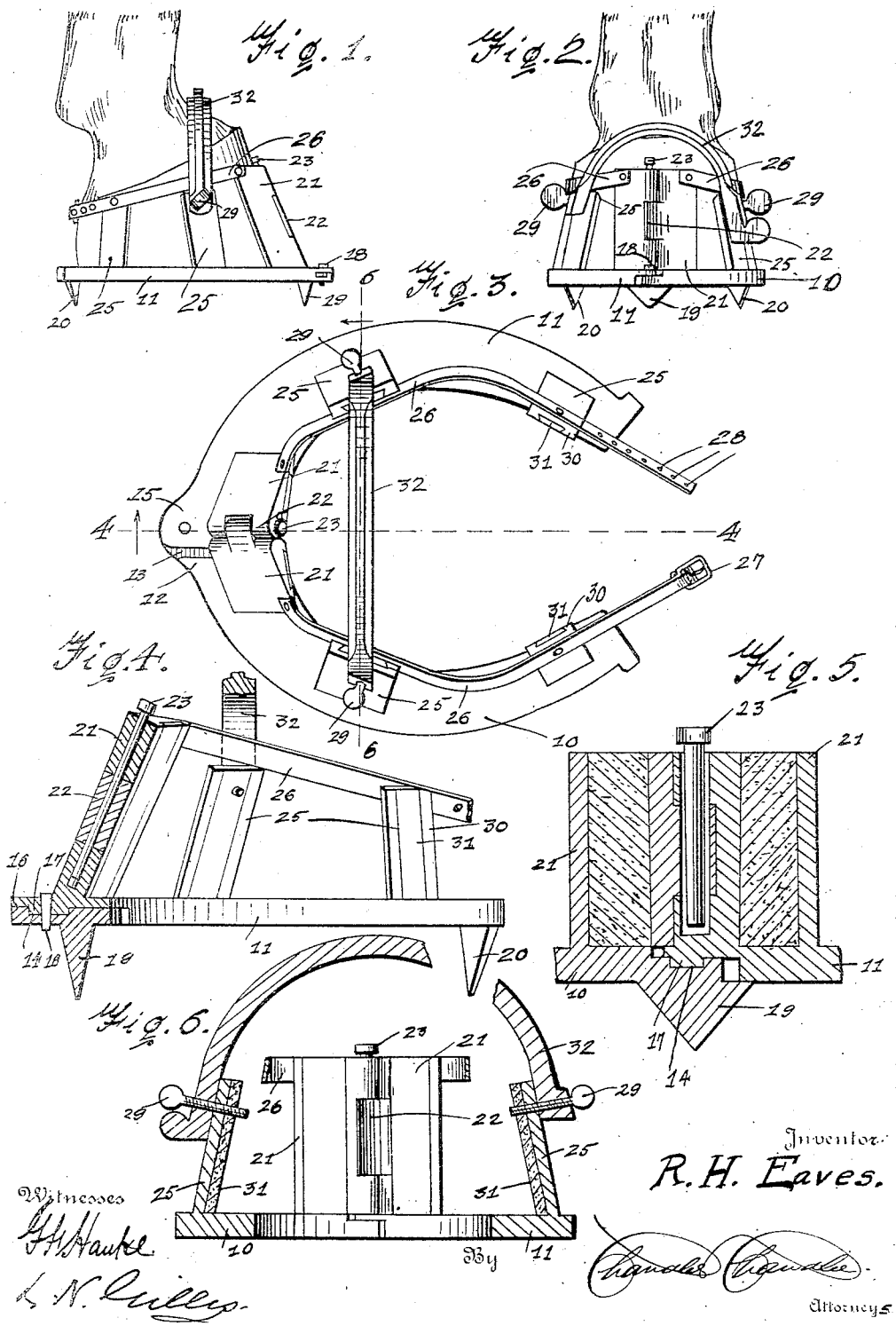

RUEL H. EAVES, OF MEEKER, OKLAHOMA.

HORSESHOE.

1,169,020.  Specification of Letters Patent.  Patented Jan. 18, 1916.

Application filed June 25, 1915. Serial No. 36,283.

*To all whom it may concern:*

Be it known that I, RUEL H. EAVES, a citizen of the United States, residing at Meeker, in the county of Lincoln, State of Oklahoma, have invented certain new and useful Improvements in Horseshoes; and I do hereby declare the following to be a full, clear, and exact description of the invention, such as will enable others skilled in the art to which it appertains to make and use the same.

This invention relates to horse shoes and has special reference to a horse shoe of the detachable type adapted to be applied to any horse's hoof at will.

The principal object of the invention is to improve and simplify the general construction of devices of this character.

A second object of the invention is to provide an improved gripping arrangement for the upper part of the horse's hoof.

With the above and other objects in view, the invention consists in general of certain details of construction and combination of parts hereinafter fully described, illustrated in the accompanying drawings, and specifically claimed.

In the accompanying drawings, like characters of reference indicate like parts in the several views and Figure 1 is a side elevation of the device as applied to the horse's hoof. Fig. 2 is a front view thereof. Fig. 3 is a plan view of the device removed from the hoof. Fig. 4 is a section on the line 4—4 of Fig. 3. Fig. 5 is a section on the line 5—5 of Fig. 3. Fig. 6 is a section on the line 6—6 of Fig. 3.

In carrying out the objects of this invention, the shoe proper is made in two halves, 10 and 11. The front end of the half 10 is provided with an enlarged portion 12 cut away on its upper surface to form a recess 13 from which extends a circular recess 14. In like manner the half 11 is enlarged as at 15 and is provided with a cut away portion forming a recess 16 on its end surface. Projecting downward into the recess 16 is a boss 17 which fits the recess 14 of the half 10 and a pin 18 fastens through this boss and a suitable opening in the half 10 to hingedly connect the two halves. At the forward end of the half 10 is provided the toe calk 19 and each half is equipped with the usual heel-calk 20. Projecting up from the forward portions of the halves are plates 21 which are connected by a hinge joint 22 provided with a pintle 23 passing through elongated openings 24 so that play may be allowed as the rear ends of the halves are moved to or from each other. Extending up from the halves are supports 25 and secured to the upper ends of the members 21 and 25 are straps 26 one of which is provided with a buckle and the other with the usual tongue-receiving openings as indicated respectively at 27 and 28. Through the forward members 25 extend set screws 29 and it is to be noted that the members 21 and 25 incline at such an angle as to fit the horse's hoof when held in position by the straps 26. Each of the members 21 and 25 is dovetailed as at 30 to receive a pad 31 of cork to prevent injury to the horse when the device is applied and it is to be noted that the set screws 29 extend through the cork, their functions being merely to prevent lateral displacement of the device.

In applying the device it is merely necessary to slip the end over the horse's hoof and buckle it tightly into place after which the said screws may be adjusted. It is also to be noted that the device is provided with a curved retaining strip 32 held in position by the set screws 29. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described but it is wished to include all such as come properly within the scope claimed.

Having thus described the invention what is claimed as new is:—

In a horse shoe of the class described, a pair of shoe sections hinged together at the toe, upwardly projecting rearwardly inclined guard plates fixed to respective sections and hingedly connected, spaced guard plates carried by each of said sections and inwardly inclined, straps each connecting the upper ends of the plates on the respective sections means to connect the ends of said straps adjustably, and set screws extending through certain of said guard plates.

In testimony whereof, I affix my signature, in the presence of two witnesses.

RUEL H. EAVES.

Witnesses:
I. J. HAMPTON,
LULA E. FOREMAN.